Patented Aug. 19, 1924.

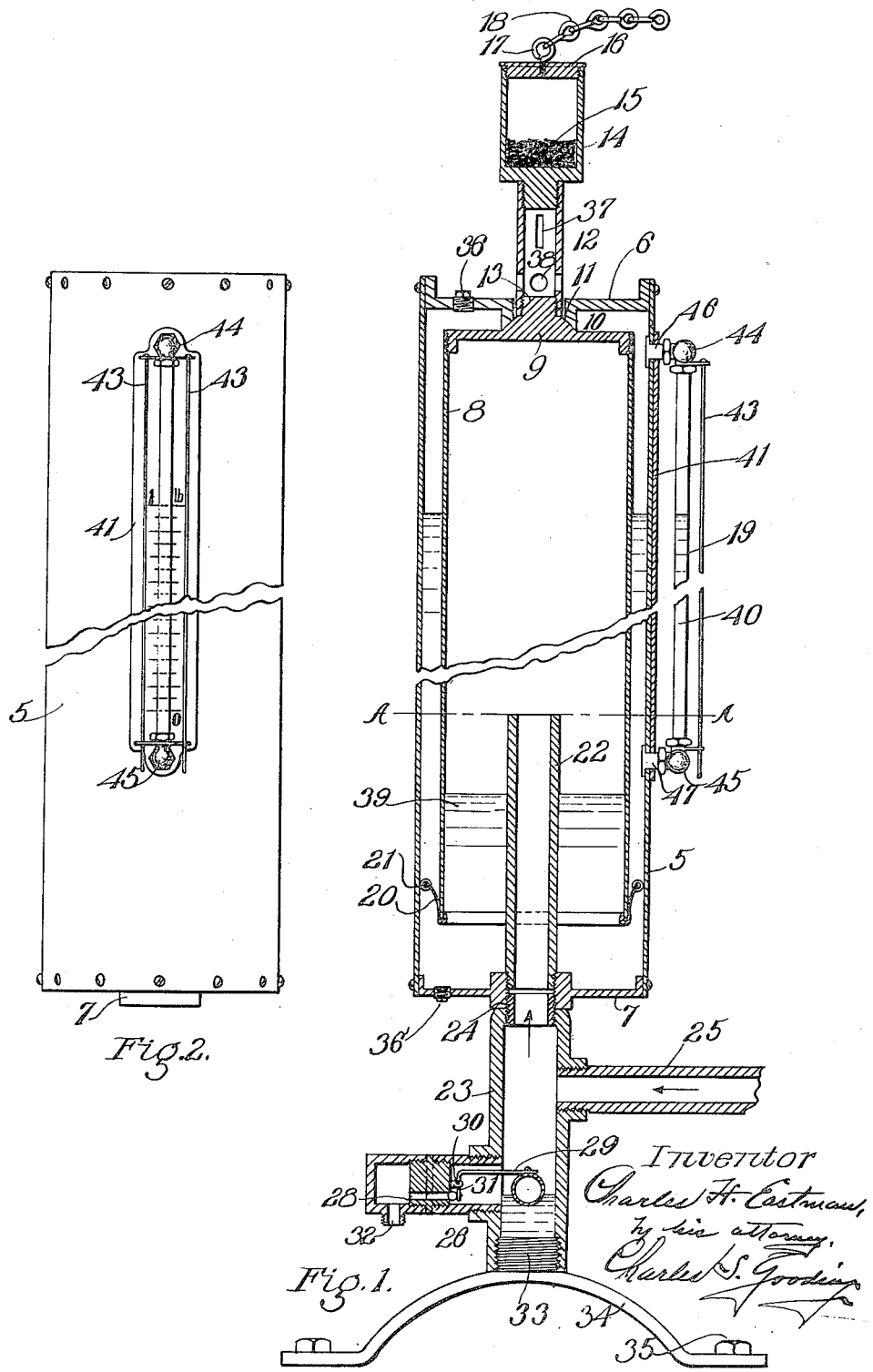

1,505,381

UNITED STATES PATENT OFFICE.

CHARLES H. EASTMAN, OF BOSTON, MASSACHUSETTS.

AUTOMATIC FLUID-CONTROL DEVICE.

Application filed February 2, 1922. Serial No. 533,727.

*To all whom it may concern:*

Be it known that I, CHARLES H. EASTMAN, a citizen of the United States, residing at Boston, in the county of Suffolk and State of Massachusetts, have invented new and useful Improvements in Automatic Fluid-Control Devices, of which the following is a specification.

This invention relates to automatic fluid control devices.

The object of the invention is to provide an automatic fluid control device for operating instrumentalities requiring steady low pressures and which, when installed, requires no attention and which cannot be tampered with or altered by unauthorized persons.

The object of the invention is further to provide a device of the character set forth which can be installed to operate at a predetermined pressure.

Another object of the invention is to provide a device of the character set forth in which there are no packings, springs or changeable parts, which is very simple in its construction and in its operation and which may be used to control pressures from one ounce to one pound.

The device of this invention is adapted to be used in connection with fuel oil supply feeds, gas, air, steam, reducing valves, release valves or any instrumentalities requiring an unchangeable standard pressure.

The device of this invention may be placed at any desired height from the floor or may be placed upon the floor if so desired independent of the height of the water line of the boiler and of low places in supply pipes, or water accumulations from water, gas, air or steam, all these conditions being taken care of by a separator and by a float valve provided in the separator and operating to discharge into a sewer or some other convenient place.

The main supply to the automatic control device is taken from some source of pressure and when the pressure has reached a predetermined amount the device of this invention is so adjusted or set as to operate instrumentalities to prevent the pressure passing beyond a predetermined amount.

The device of this invention acts directly upon said instrumentalities and the slightest drop in pressure will operate to actuate such instrumentalities.

The action of the control device of this invention is positive, simple, very powerful, of very few parts and can be set to operate at any desired and predetermined pressure.

In order to secure the foregoing objects, the device of this invention embodies primarily a casing closed at its opposite ends and preferably cylindrical; within this casing is located a hollow float closed at its upper end and open at its lower end and a water seal is provided within the casing and float. The float is caused to rise by means of fluid under pressure which is introduced into the interior thereof by means of pipes. The upper end of the float has a member thereon which is slidably mounted in the upper end of the casing, and this member is provided with a receptacle containing weights and is connected thereby to the instrumentalities which it is desired to operate by the control device. The sliding member is provided with ports which control the pressure of air in the casing. The fluid under pressure supplied to the interior of the float is connected thereunto by pipes without any valves or operating parts of any kind, but interposed between the main pressure pipe and the pipe which leads into the interior of the float is a separator and this constitutes one of the principal features of my invention. This separator is located beneath the casing and is provided with an outlet pipe containing a float valve, which valve is operated by a float located in the separator so that any water which results from condensation of the fluid under pressure which operates the device, whether it be steam, gas or air, enters this separator and passes out of the same through said float valve.

Another improved feature of the device consists in providing as a part thereof a glass gauge which communicates at its top and bottom with the casing, and in connection with this gauge a scale is provided so that the height of the water in the gauge indicates the height of the water in the casing and also by reference to the scale the pressure in the float is determined.

Another feature of the invention whereby the same is adapted to be used in a variety of places and located at any desired height from the ground consists in the construction whereby the separator is connected to the base.

The invention consists in the combination and arrangement of parts set forth in the following specification and particularly pointed out in the claims thereof.

Referring to the drawings:

Figure 1 is a vertical sectional elevation of a control device embodying my invention.

Fig. 2 is a detail side elevation of a portion thereof.

Like numerals refer to like parts throughout the several views of the drawings.

In the drawings, 5 is a casing, preferably cylindrical and closed at its opposite ends by a top 6 and a bottom 7. Inside the casing 5 a float 8 is provided which is open at the bottom and closed by a top 9 fast thereto. The top 9 has a valve forming a part thereof and adapted to contact with a seat 11 provided on the inner face of the top 6. A pipe 12 has screw-threaded engagement with a boss 13 extending upwardly from the valve 10 on the cover 9 and this pipe is provided with ports 37 and 38 and when the float is in its uppermost position with the valve 10 contacting with the seat 11 as in the drawing, Fig. 1, the ports 37 and 38 are both in communication with the atmosphere, but when the float lowers in a manner hereinafter described, the ports 38 communicate with the interior of the casing 5 and the ports 37 communicate with the atmosphere whereby communication from the interior of the casing to the atmosphere is provided. To the upper end of the pipe 12 is fastened a receptacle 14 adapted to contain shot or other weight instrumentalities 15. The receptacle 14 is provided with a cover 16 to which is attached a screw eye 17 adapted to have connected thereto a chain 18. The chain 18 is connected in a manner well known to those skilled in the art to instrumentalities to be operated by the control device such, for example, as valves on feed pipes for oil, where oil fuel is used, on reducing pressure valves, valves for reducing the pressure of gas, air or steam.

The casing 5 is provided with a water gauge 19 consisting of a tell-tale glass 40 which registers the height of water in the casing 5 and which read in connection with a scale 41 fast to said casing and located at the rear of the water glass enables the ounces of pressure in the float to be read. The scale 41 is graduated at 42 to indicate ounces of pressure in the float. The glass 40 is protected by two rods 43. The glass 40 and the rods 43 are connected at their upper and lower ends respectively to water glass fittings 44 and 45, which are connected by sockets 46 and 47 respectively to the interior of the casing and thus free passage of water and air is obtained through the glass whereby the glass becomes in operation and effect a part of the casing 5.

The lower end of the float 8 has a plurality of arms 20, each provided with an antifriction roller 21 adapted to engage the inner surface of the casing 5 and constituting anti-friction guide members for the lower end of the float. A pipe 22 open at its upper end has screw-threaded engagement with the bottom 7 of the casing and a separator 23 is fastened to the bottom 7 by a nipple 24. The separator 23 has a pipe 25 connected thereto and leading to a source of fluid under pressure, a valve 26 opens out of the separator 23 below the pipe 25 and is operated to open and close a port 28 by means of a float 29 pivoted at 30 to an ear 31 on said valve. An outlet port 32 conducts the liquid which passes through the port 28 in the valve 26 to any desired waste pipe or other location. The lower end of the separator 23 has screw-threaded engagement with a boss 33 extending upwardly from the top of a base 34 which is adapted to be fastened by screws or bolts 35 to the floor or to any other stationary supporting means. A plug 36 having screw-threaded engagement with the top 6 of the casing is provided whereby access to the casing 5 may be obtained for the purpose of supplying water thereto and another plug 36′ in the bottom of said casing is provided to enable the water to be emptied out of the casing when so desired. It will be understood that the top 6 and bottom 7 are fastened to the cylindrical portion of the casing in such a manner as to form a water tight fit and the same is true of the top 9 which is attached to the float 8. The float 8 is preferably made of some non-corrodible metal such, for example, as copper, and the anti-friction rollers 21 and arms 20 are also preferably formed of non-corrodible metal. The valve 10 and its seat 11 are ground to form a union joint, and are preferably ground at an angle of 45 degrees.

The general operation of the device hereinbefore specifically described is as follows:—Assuming liquid such as water to have been inserted through the opening which is closed by the plug 36 in the top 6 to the height of the line A—A and that fluid under pressure is introduced to the interior of the float 8 through the pipe 25, separator 23 and pipe 22; all condensation of supply fluid is separated and falls, being taken care of by a valve 26. The water 39 in the float will be forced downwardly by the pressure of said fluid and will be forced upwardly in the space between the float 8 and the casing 5. The air which at that time is enclosed in the space between the float and the casing will pass through the holes 38 which are at that time positioned inside the casing 5 below the top 6 thereof and will pass outwardly to the atmosphere through the slots 37 which at that time are positioned above the top 6. This operation will continue, the float rising and the water between the walls of the float and of the casing also rising and the water inside the float descending until the valve 10 contacts with the seat 11 as shown in the drawing, Fig. 1, at which time the holes 38 will be located above the top 6. When the valve 10 contacts with the seat 11 the casing will be absolutely tight and no water, air or steam can pass out of the casing, the valve 10 when in the position illustrated in Fig. 1 absolutely closing the casing against the passage of anything out of the same.

The vertical movement thus imparted to the float will be transmitted by the pipe 12 and chain 18 to operate any of the desired instrumentalities hereinbefore set forth.

It will be understood that the receptacle 14 is provided with a certain amount of shot 15 according to the pressure under which it is desired that the device of this invention shall operate and then before installing the device the cover 16 is sealed to the receptacle so that it cannot be tampered with. The receptacle is also locked in any desirable manner with the pipe 12 and the pipe 12 is locked in like manner to the top 9 of the float, thus making these parts permanently positioned with relation to each other.

It will be noted that the inner diameter of the separator is considerably larger than the inner diameter of the pipes 25 and 22 and as the vapor fills the separator and moves very slowly through the pipes 25 and 22 to the interior of the float 8, liquid, which condenses from said vapor, will fall to the bottom of the standard or separator 23 and when said liquid arrives at a certain height the float 29 will be operated to open the valve 26 and allow the liquid to pass out through the ports 28 and 32 to the sewer or to any other desirable receptacle or outlet.

As the fluid passes from the pipe 22 into the float 8 it will rise to the top of the cylinder, compressing the air in the float and forcing the water 39 downwardly and into the cylinder 5 and into the space between the walls of the float and the wall of the cylinder. When the pressure of the fluid increases to the predetermined amount for which the float is set, said float will slowly rise until the valve portion 10 thereof contacts with the seat 11 and will remain in that position until the pressure in the separator drops below the amount which has been predetermined for the particular device under consideration, whereupon the float will slowly return to its starting position and the level of the liquid in the float and in the space between the float and casing will be at the line A.

If steam is the fluid which is being used and condensation has increased the amount of water in the float and in the casing 5 the surplus water thus accumulated will overflow through the pipe 22 and separator 23 and will pass out through the valve 26 as hereinbefore described.

It will be evident that with a device of this invention no vacuum can take place in the float 8 as the interior of said float is, at all times, open to the source of fluid supply under pressure above the water seal, and it will also be seen that no vacuum will occur in the casing 5 above the water, the pipe 12 having a loose sliding fit in the cover 6.

The word "fluid" as used in the specification and in the claims is intended to include gas, air, steam and vapor, but is not intended to include liquid.

It will be seen that the separator and the parts attached thereto including the casing 5 and float 8 may be set at any desired height by introducing a screw-threaded pipe between the base 34 and the separator 23, one end of the pipe being screwed into the bottom of the separator and the other end of the pipe being screwed onto the boss 33 on the base 34. By using pipes of different lengths in this connection, it will be seen that the control device may be set at any desired height. Particular attention is called to the fact that by the construction hereinbefore described the fluid under pressure enters the separator 23 and passes directly through the open pipe 22 from the separator into the float above the water seal, there being no valves or instrumentalities of any kind located in the pipe 22 or in that part of the separator leading thereto and, therefore, the interior of the float is open at all times to the fluid under pressure which is conveyed thereto by the pipe 25, separator 23 and pipe 22. By this extremely simple construction whereby the fluid under pressure has unobstructed passage from the main supply pipe into the float the lightest pressure of the fluid will operate at once upon the float, and, therefore, upon the instrumentalities connected therewith. It will also be obvious that no vacuum can take place in the float as the float is at all times open to the source of supply above the water seal.

I claim:

1. An automatic fluid control device having, in combination, a hollow casing closed at its opposite ends, a hollow float in said casing closed at its upper end and open at its lower end, liquid in said casing forming a liquid seal between said casing and float, means to convey fluid to the interior of said float above the liquid therein, a member outside said casing and connected to said float whereby instrumentalities outside said casing may be operated and means operated by said float to open and close communication between the interior of said casing and the atmosphere.

2. An automatic fluid control device having, in combination, a hollow casing closed at its opposite ends, a hollow float in said casing closed at its upper end and open at its lower end, liquid in said casing forming a liquid seal between said casing and float, means to convey fluid to the interior of said float above the liquid therein, a member outside said casing and connected to said float whereby instrumentalities outside said casing may be operated and a valve operated by said float to open and close communication between the interior of said casing and the atmosphere.

3. An automatic fluid control device having, in combination, a hollow casing closed at its opposite ends, a hollow float in said casing closed at its upper end and open at its lower end, liquid in said casing forming a liquid seal between said casing and float, means to convey fluid to the interior of said float above the liquid therein, a member outside said casing and connected to said float whereby instrumentalities outside said casing may be operated and a valve forming a part of said float and adapted to open and close communication between the interior of said casing and the atmosphere.

4. An automatic fluid control device having, in combination, a hollow casing closed at its opposite ends, a hollow float in said casing closed at its upper end and open at its lower end, liquid in said casing forming a liquid seal between said casing and float, means to convey fluid to the interior of said float above the liquid therein and a member outside said casing and connected to said float whereby instrumentalities outside said casing may be operated, a valve seat on said casing and a valve forming a part of said float and adapted to contact with said valve seat to close communication between the interior of said casing and the atmosphere.

5. An automatic fluid control device having, in combination, a hollow casing closed at its opposite ends, a hollow float in said casing closed at its upper end and open at its lower end, liquid in said casing forming a liquid seal between said casing and float, means to convey fluid to the interior of said float above the liquid therein and a conduit fast to the upper end of said float and projecting through the top of said casing whereby instrumentalities outside said casing may be operated.

6. An automatic fluid control device having, in combination, a hollow casing closed at its opposite ends, a hollow float in said casing closed at its upper end and open at its lower end, liquid in said casing forming a liquid seal between said casing and float, means to convey fluid to the interior of said float above the liquid therein, a conduit fast to the upper end of said float projecting through the top of said casing and slidable therein, a receptacle fast to the upper end of said conduit and means connected to said receptacle whereby instrumentalities outside said casing may be operated.

7. An automatic fluid control device having, in combination, a hollow casing closed at its opposite ends, a hollow float in said casing closed at its upper end and open at its lower end, liquid in said casing forming a liquid seal between said casing and float, means to convey fluid to the interior of said float above the liquid therein, a pipe fast to the upper end of said float projecting through the top of said casing and slidable therein, said pipe being provided with ports adapted to open communication between the interior of said casing and the atmosphere and means connected to said pipe whereby instrumentalities outside said casing may be operated.

8. An automatic fluid control device having, in combination, a hollow casing closed at its opposite ends, a hollow float in said casing closed at its upper end and open at its lower end, liquid in said casing forming a liquid seal between said casing and float, means to convey fluid to the interior of said float above the liquid therein, a valve seat on the inner face of the top of said casing, a valve on the upper end of said float adapted to engage said seat when said float is in elevated position, a pipe fast to the upper end of said float projecting through the upper end of said casing and slidable therein, said pipe being provided with ports whereby instrumentalities outside said casing may be operated and communication between the interior of said casing and the atmosphere opened and closed.

9. An automatic fluid control device having, in combination, a hollow casing closed at its opposite ends, a hollow float in said casing closed at its upper end and open at its lower end, liquid in said casing forming a liquid seal between said casing and float, means to convey fluid to the interior of said float above the liquid therein, a conduit fast to the upper end of said float extending through the upper end of said casing and slidable therein, and anti-friction guide members fast to said float and engaging the inner wall of said casing whereby instrumentalities outside said casing may be operated.

10. An automatic fluid control device having, in combination, a hollow casing closed at its opposite ends, a hollow float in said casing closed at its upper end and open at its lower end, liquid in said casing forming a liquid seal between said casing and float, a pipe extending through the bottom of said casing and upwardly into the interior of said float, a separator fast to said pipe and extending downwardly therefrom, a base fast to said separator, a pipe leading into said separator and adapted to be connected to a source of fluid under pressure and a float valve connected to said separator beneath said last-named pipe.

11. An automatic fluid control device having, in combination, a hollow casing closed at its opposite ends, a hollow float in said casing closed at its upper end and open at its lower end, liquid in said casing forming a liquid seal between said casing and float, a pipe extending through the bottom of said casing and into the interior of said float, a separator fast to said pipe and extending downwardly therefrom, a pipe connected to said separator adapted to supply fluid under pressure and a base adjustably fastened to said separator whereby the distance of said casing from said base may be varied.

12. An automatic fluid control device having, in combination, a hollow casing closed at its opposite ends, a hollow float in said casing closed at its upper end and open at its lower end, liquid in said casing forming a liquid seal between said casing and float, a pipe extending through the bottom of said casing and into the interior of said float, a separator fast to said pipe and extending downwardly therefrom, a pipe connected to said separator adapted to supply fluid under pressure, a base and means connecting said base and separator whereby the distance of said casing from said base may be varied.

13. An automatic fluid control device having, in combination, a hollow casing closed at its opposite ends, a hollow float in said casing closed at its upper end and open at its lower end, liquid in said casing forming a liquid seal between said casing and float, a pipe extending through the bottom of said casing and upwardly into the interior of said float, a supply pipe leading to a source of fluid under pressure, a separator interposed between said supply pipe and said first named pipe and means connected to said separator to automatically allow liquid to pass out of the separator when it arrives at a predetermined height therein.

14. An automatic fluid control device having, in combination, a hollow casing closed at its opposite ends, a hollow float in said casing closed at its upper end and open at its lower end, liquid in said casing forming a liquid seal between said casing and float, a pipe extending through the bottom of said casing and upwardly into the interior of said float, a supply pipe leading to a source of fluid under pressure, a separator interposed between said supply pipe and said first-named pipe and means connected to said separator beneath said second-named pipe to automatically allow liquid to pass out of said separator when it arrives at a predetermined height.

In testimony whereof I have hereunto set my hand in presence of two subscribing witnesses.

CHARLES H. EASTMAN.

Witnesses:
FRANKLIN E. LOW,
HAZEL F. LaMUDGE.